United States Patent
Loza et al.

(10) Patent No.: US 6,794,483 B2
(45) Date of Patent: Sep. 21, 2004

(54) DICAPPED UNSATURATED POLYESTER LAMINATING POLYESTER RESINS WITH REDUCED EMISSION LEVELS OF VOC'S

(75) Inventors: Roman Loza, Dublin, OH (US); Danny G. Hartinger, Columbus, OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/679,989

(22) Filed: Oct. 7, 2003

(65) Prior Publication Data

US 2004/0068088 A1 Apr. 8, 2004

Related U.S. Application Data

(60) Provisional application No. 60/416,805, filed on Oct. 8, 2002.

(51) Int. Cl.$^7$ ............................ G08G 63/52; C08F 20/00
(52) U.S. Cl. ................... 528/306; 528/295.5; 528/300; 528/301; 528/302; 528/308; 528/308.6; 525/437; 525/445
(58) Field of Search ................. 528/295.5, 300, 528/301, 302, 306, 308, 308.6; 525/437, 445

(56) References Cited

U.S. PATENT DOCUMENTS

| | | | | |
|---|---|---|---|---|
| 4,072,642 A | * | 2/1978 | Ritz et al. | 528/298 |
| 4,148,765 A | * | 4/1979 | Nelson | 525/7 |
| 4,233,432 A | * | 11/1980 | Curtis, Jr. | 528/298 |
| 4,246,367 A | * | 1/1981 | Curtis, Jr. | 525/49 |
| 6,107,446 A | * | 8/2000 | Loza et al. | 528/272 |
| 6,222,005 B1 | * | 4/2001 | Loza et al. | 528/295.5 |

* cited by examiner

*Primary Examiner*—Samuel A. Acquah
(74) *Attorney, Agent, or Firm*—Martin Connaughton

(57) ABSTRACT

The present invention provides a process for the preparation of low styrene content resins prepared by first reacting an unsaturated carboxylic acid, its corresponding anhydride or mixtures thereof with a monohydric alcohol, DCPD and water and reacting the product of the first step with a polyol and optionally an oil containing unsaturation, its corresponding fatty acid or mixtures thereof.

10 Claims, No Drawings

DICAPPED UNSATURATED POLYESTER LAMINATING POLYESTER RESINS WITH REDUCED EMISSION LEVELS OF VOC'S

CROSS-REFERENCE TO RELATED APPLICATIONS

This application is a continuation-in-part of U.S. Provisional Application Serial No. 60/416,805; filed Oct. 8, 2002

BACKGROUND OF THE INVENTION

The present invention relates to low styrene content resins which exhibit reduced emissions of volatile organic compounds (VOC) compared to resin systems containing higher levels of styrene. More particularly the invention relates to a process for preparing unsaturated polyester resins which contain low levels of styrene (typically <35% by weight based on the total combined weight of the resin and the styrene).

Much of the work on low VOC unsaturated polyester systems has focused on the use of waxes as a means of reducing emission. During cure, waxes, which are initially dissolved or dispersed in the resin, form a thin film on the surface of the fabricated article. The film acts as a physical barrier preventing styrene from evaporating from the surface of the curing part. This reduces styrene emissions. Unfortunately, this waxy film substantially diminishes interlaminar adhesion, reducing the strength of molded articles made using a multilaminate construction. An alternative to the use of wax, is to reduce the molecular weight of the unsaturated polyesters. The lower molecular weight polyester requires the use of less styrene to maintain an appropriate working viscosity. One common way to reduce molecular weight in polyester synthesis is to increase the concentration of one of the reactants relative to the other. Another technique is to use a monofunctional group to cap growing chains. Dicyclopentadiene (DCPD) based resins are a good example of the latter technique. The DCPD replaces carboxylic acid end-groups increasing solubility of the polyester in styrene. However, the DCPD groups can undergo side-reactions leading to a broad molecular weight distribution. Polymers with a broad molecular weight distribution tend to be higher in viscosity and require more styrene. Adding more DCPD further lowers molecular weight and more side reactions occur. In addition, the DCPD based resins perform poorly in corrosive environments and their mechanical properties tend to be at the low end of what is common for unsaturated polyester resins. In general, the higher the DCPD content the lower the performance.

An alternative to capping with DCPD is capping with a low molecular weight alcohol as described in recent U.S. Pat. Nos. (6,107,446 and 6,222,005), the contents of which are expressly incorporated herein. The '446 and '005 patents describe a process for preparing low viscosity resins with a low acid value (AV) and hydroxyl value (HV) that can be used in laminating applications. The process in '446 and '005 requires that a substantial amount of an alcohol be reacted with maleic anhydride (0.5 to 1.0 moles of alcohol per mol of maleic anhydride) followed by reaction with a glycol. In the reaction with glycol, a majority of the alcohol is removed along with water in the distillate. The efficiency of alcohol incorporation into the final resin is about 25%. The alcohol can be reused after purification but that is an added step and expense. Less alcohol can be used but incorporation efficiency does not improve and the number of polar end-groups increases. In addition, some of the resins made using this process are susceptible to air inhibition during cure at the air-laminate interface. This gives laminates with a tacky surface—an undesirable characteristic.

It has been found that adding DCPD to the alcohol capping process described in patents '446 and '005 reduces the amount of alcohol required and can increase the efficiency at which the alcohol that is used is incorporated into the polymer. As is shown in the examples the amount of ethanol required by the present process is decreased by up to 50% and ethanol retention is doubled when DCPD is added. The incorporation of even small amounts of DCPD (10–15 mol/100 mol maleic anhydride) improves surface cure such that laminates dry tack-free. The resins prepared by the process of this invention do not suffer from the deficiencies in performance seen with traditional low viscosity styrene resins.

BRIEF SUMMARY OF THE INVENTION

In order to achieve a usable viscosity at low styrene levels, the process of this invention utilizes esterification or transesterification reactions where small alkyl groups from the reaction of a monohydric alcohol and dicyclopentadiene (DCPD) moieties are added to the end of the polyester chains. Both the alcohol and DCPD are non-polar chain-ends, commonly referred to as caps, and replace polar end-groups such as a carboxylic acid or glycol hydroxyl. This gives an unsaturated polyester resin or "dicap" resin with a lower styrene requirement. Less styrene in the laminating resin reduces VOC emissions when the resins of this invention are molded into articles of commerce using open-molding techniques.

DETAILED DESCRIPTION OF THE INVENTION

The dicap resins are prepared by reacting a carboxylic acid having at least two carboxyl functional groups and containing ethylenic unsaturation, ie. containing C=C bonds, its corresponding anhydride or a mixture of suitable acids/anhydrides, with a saturated monohydric alcohol or mixture of alcohols such as methanol or ethanol, DCPD and water. The DCPD and alcohol can be reacted with the carboxylic acid/anhydride and water in any order or simultaneously. The carboxylic acid or anhydride can be reacted first with the alcohol followed by addition of water and DCPD or all the components can be reacted together. Generally, one reactor can be used for the entire reaction. This is called the one-pot method. Alternatively, the reaction can be conducted by reacting the carboxylic acid or anhydride, water and DCPD in one vessel and reacting the alcohol and carboxylic acid or anhydride in a second vessel then combining the contents of the two vessels and adding a glycol or glycols to prepare the final dicap resin. This is called the two-pot method.

The preferred method depends on reactor sizes and the configuration of the manufacturing facility. In most manufacturing facilities the one-pot method will be preferred. Using either method the reaction between alcohol and carboxylic acid or anhydride and DCPD and water with carboxylic acid or anhydride is conducted with some form of agitation such as stirring at about 158–300° F. at atmospheric conditions.

Additives commonly used in preparing unsaturated polyester resins can be used. These include inhibitors, catalysts, and the like. The progress of the reaction can be followed by measuring the acid value (ASTM D1639-90) of the mixture. After substantially all of the alcohol and DCPD have reacted with the carboxylic acid/anhydride (one-pot method) the intermediate is thought to be a mixture of carboxylic acid acid/anhydride, monoesters and diesters where the DCPD and alcohol comprise the alcohol portion of the ester. At this point, the second step, glycols are added and the mixture is heated to 355–430° F. with some form of agitation such as stirring. Volatiles are removed, preferably by distillation and the acid value (ASTM D1639-90) and viscosity (ASTM D1545-89) of the mixture are monitored until the desired end-point is reached. In addition the reaction with the glycols can be carried out in the presence of oils containing ethylenic unsaturation such as soybean oil. The reaction mixture is cooled and styrene is added to give the desired laminating resins. Inhibitors can be added to the styrene for extending storage stability of the resin.

Examples of unsaturated carboxylic acids and corresponding anhydrides useful in the invention include maleic acid, fumaric acid, itaconic acid and maleic anhydride. In addition other acids, anhydrides or esters of the acids can be added to modify the chemical composition. Examples of such acids and anhydrides include phthalic acid, isophthalic acid, terephthalic acid, tetrahydrophthalic anhydride, phthalic anhydride, nadic anhydride, methylnadic anhydride, hexahydrophthalic anhydride, dimethyl terephthalate and the like. Maleic acid and maleic anhydride are preferred.

Examples of saturated monohydric alcohols are those alcohols having a boiling point of less than about 300° F. at standard temperature and pressure include methanol, ethanol, 1-propanol, 2-propanol, 1-butanol, 2-butanol and the like. Primary alcohols such as methanol and ethanol are preferred.

Dicyclopentadiene is used in the process of the invention as a capping agent. There are different grades of DCPD. Low grade DCPD typically has greater than 0.1% by weight of C-5 trimer. Polyester grade DCPD typically has less that 0.1% by weight C-5 trimer. Preferably, polyester grade DCPD is used. Polyester grade DCPD is available from Equistar.

A wide variety of polyols can be used in the process of the invention. Included would be common diols such as ethylene glycol, propylene glycol, 1,3-propanediol, 1,4-propanediol, 1,4-butanediol, 2,2-dimethyl-1,3-propanediol, 2-methyl-1,3-propanediol, glycol ethers such as diethylene glycol and dipropylene glycol, and polyoxyalkylene glycols like polyoxyethylene glycol and polyoxypropylene glycol. Triols and higher functional polyols such as glycerol, trimethylol propane and oxyalkylated adducts thereof can also be used. Preferably, the polyols are aliphatic or alicyclic and optionally contain C—O—C linkages.

Examples of oils containing unsaturation include castor oil, peanut oil, linseed oil, safflower oil, olive oil, cotton oil, rapeseed oil, soybean oil and tung oil. In addition, fatty acids could be used instead of the oil. An example would be ricinoleac acid instead of castor oil. Modified oils such as epoxidized soybean oil may also be used. The use of soybean oil is preferred. Up to 45 wt % of the oil based on the total weight of all components charged minus distillate collected can be used. Preferably from 5 wt % to 45 wt % of oil is used. More preferably between 10 wt % and 30 wt % of oil is used in the process.

Other materials commonly used in the synthesis of unsaturated polyester resins, such as solvents, isomerization and/or condensation catalyst, promoters, etc. can be used in the process of the invention. Examples of solvents are those commonly known in the art and include but are not limited to hexane, cyclohexane, benzene, toluene, xylene, and mixtures of solvents. Commonly used inhibitors include hydroquinone, p-benzoquinone, di-t-butylhydroquinone, t-butylcatechol, phenothiazine, and the like. Catalysts used to promote the condensation reaction include p-toluene sulfonic acid, methane sulfonic acid, zinc salts (e.g. acetate), organotin compounds (dibutyl tin oxide) and other materials known to those skilled in the art. Isomerization catalysts include organic amines such as morpholine and piperidine.

In the following examples several dicap resins were prepared by the process of the invention. The following abbreviations were used EG-ethylene glycol, DPG-dipropylene glycol, DCPD-dicyclopentadiene, AV-acid value ASTM D1639-90, HV-hydroxyl value ASTM E 222-94, TS-tensile strength (psi), TM-tensile modulus (ksi) and ELG-elongation (%) were measured using ASTM D638, HDT-heat deflection under load (C°) ASTMD648-97.

In general, the process of this invention is carried out by reacting at about 90–175° F. maleic anhydride with ethanol. When this reaction is completed, water and DCPD are added and the temperature is raised to 260° F. Cooling may be needed during this step. The reaction with DCPD can be followed by a change (drop) in AV. Alternatively, the maleic anhydride, ethanol and DCPD can be reacted in one step. Once the target AV is achieved (AV will depend on amount of maleic anhydride, water, ethanol and DCPD that is used) the desired glycols, oils, inhibitors and catalysts are added and the temperature is raised to 380–420° F. Volatiles are removed by distillation. Condensation is continued until the target AV and the Gardner-Holt viscosity (in stokes, by ASTM D 1545-76, (parts resin/parts styrene)) are reached. The product resin is diluted with styrene containing inhibitors and the final AV, HV and the final viscosity (cps) are measured using a Brookfield viscometer available from Brookfield Engineering Laboratories, Inc., 11 Commerce Blvd., Middleboro Mass. 02346).

COMPARATIVE EXAMPLE C1 AND EXAMPLE 1 AND 2

EXAMPLE C1

Maleic anhydride (900 g), ethanol (287 g) and dipropyleneglycol (DPG, 394 g) were reacted for 2.8 h at 80° C. DPG (172.4 g), hydroquinone (0.175 g), triphenyl phosphite (0.175 g) and zinc acetate dihydrate (1.04 g) were added and the mixture was reacted at 203° F. for 3.3 h with removal of distillate. The mixture was cooled to 150° C. DPG (566.3 g), piperidine (1.69 g) and hydroquinone (0.106 g) were added and the mixture was reacted at 210° C. for 13.4 h. The resulting product (2,000 g) had an AV of 26 and an HV of 47. The viscosity of a styrene solution of the resin was 3,710 cps at a styrene level of about 18%. NMR analysis of the product showed that about 16% of the ethanol charged was retained in the product.

EXAMPLE 1

Preparation of Ethanol and DCPD Capped Resin Using the Inventive Process

Maleic anhydride (500.0 g) and ethanol (164.4 g) were reacted at 79° C. for 2 h. DCPD (168.2 g) and water (27.5 g) were added and the mixture was heated to 125° C. (cooling was needed to maintain the temperature at 125° C.). Reaction time at 125° C. was 4 h. DPG (273.6 g), hydroquinone (0.11 g), triphenyl phosphite (0.11 q) were added and the mixture was reacted at 196° C. for 2 h with removal of distillate. The mixture was allowed to cool overnight. The next morning DPG (273.6 g), piperidine (1.06 g) and hydroquinone (0.05 g) were added and the mixture heated at 196° C. for 10.5 h with removal of distillate. The product (1,200 g) had an AV of 26 and an HV of 24. The viscosity of a styrene solution of the resin was 2,508 cps at a styrene level of about 18%.

EXAMPLE 2

Preparation of Ethanol and DCPD Capped Resin Using the Inventive Process

Maleic anhydride (1772.4 g) water (65.2 g) ethanol (249.6 g) and DCPD (310.4 g) were reacted at 40–49° C., with cooling as needed for 0.5 h. The mixture was heated to 82° C. and the temperature was maintained at that temperature for 2 h. DPG (1744.8 g) and piperidine (4 g) were added and the reaction mixture was heated to 204° C. and held for 9.8 h with removal of distillate. The product (4,000 g) had an AV of 20 and an HV of 18. The viscosity of a styrene solution of the resin was 1,680 cps at a styrene level of about 27%. Nmr analysis showed that 22% of the ethanol was retained in the product.

These examples show that inventive process gives resins that are lower in HV and viscosity at a comparable styrene level. More importantly, as shown Example 2 and Comparative Example C1 the amount of ethanol required decreases by 56% from 145 g/Kg-product in C1 to 62 g/Kg-product in Example 2. The retained ethanol also increases from 18% to 22% further demonstrating the higher efficiency of the inventive process.

COMPARATIVE EXAMPLE C3 AND EXAMPLE 3

COMPARATIVE EXAMPLE C3

Preparation of a DCPD Resin Using a Standard UPR Process

Water (92.7 g), DCPD (699.7 g) and maleic anhydride (500.0 g split into two 250 g charges added about an hour apart) were reacted with stirring at 127° C. until an AV of 221 was reached (2.8 h). Then EG (66.5 g), DEG (227.1 g) DPG (273.6 g), piperidine (1.19 g) triphenyl phospite (0.19 g) and hydroquinone (0.28 g) were added and the mixture was reacted at 385° F. for 4.5 h. The product had an AV of 25 and an HV of 54. The viscosity of a styrene solution of the resin was 770 cps at a styrene level of about 17%. A neat resin casting was prepared (20% styrene, 2.7% vinyl toluene, room-temperature cure with a post-cure of 2 h at 60° C.) from this resin. Properties were as follows: TS—5,641, TM—427, ELG—1.6 and HDT—59.

EXAMPLE 3

Preparation of Ethanol and DCPD Capped Resin Using the Inventive Process

Maleic anhydride (700.0 g) and ethanol (164.4 g) were reacted at 79° C. for 1.7 h. Water (64.2 g) and DCPD (706.4 g) were added and the mixture was heated to 127° C. and maintained until an AV of 233 was reached. Cooling was needed to maintain the temperature at 127° C. Reaction time was 3 h. Then EG (88.6 g), DEG (75.7 g) hydroquinone (0.17 g), triphenyl phosphite (0.17 g) were added and the mixture was reacted at 196° C. for 3 h with removal of distillate. The reaction mixture was allowed to cool overnight. The next day, DEG (227.1 g), piperidine (1.52 g) and hydroquinone (0.08 g) were added and the mixture heated to 197° C. for 6.5 h. The product had an AV of 27 and an HV of 25. The viscosity of a styrene solution of the resin was 792 cps at a styrene level of about 17%. A neat resin casting was prepared (20% styrene/2.9% vinyl toluene, room temperature cure with a post-cure of 2 h at 60° C.) from this resin. Properties were as follows: TS—7,236, TM—476, ELG—2.0 and HDT—74. Nmr analysis showed that about 33% of the ethanol charged was retained in the product. The resin made by the process of this invention has a lower HV, better mechanical properties and a higher HDT when compared to a DCPD resin prepared using a standard polyester process. Compared to Comparative Example 1 ethanol retention doubled (33 vs 16%.

COMPARATIVE EXAMPLE C4 AND EXAMPLE 4

COMPARATIVE EXAMPLE C4

Preparation of a DCPD DEG-UP Resin Using a Standard UPR Process.

The process of Comparative Example C3 was used to prepare a resin having the following mole ratio: maleic anhydride (1.00 mol), water (1.01 mol), DCPD (1.04 mol) and DEG (0.60 mol). The product had an AV of 28 and an HV of 46. The viscosity of a styrene solution of the resin was 735 cps at a styrene level of about 17%. A neat resin casting was prepared (heat cured) from this resin. Properties were as follows: TS—5,869, TM—555, ELG—1.2 and HDT—89.

EXAMPLE 4

Preparation of Ethanol and DCPD Capped DEG UP Resin Using the Inventive Process The process of Example 3 was used to prepare a resin having the following mole ratio: maleic anhydride (1.00 mol), ethanol (0.48 mol), water (0.50 mol), and DCPD (0.75 mol) and (DEG (0.60 mol). The product had an AV of 26 and an HV of 28. The viscosity of a styrene solution of the resin was 593 cps at a styrene level of about 17%. A neat resin casting was prepared (heat cured) from this resin. Properties were as follows: TS—8,459, TM—529, ELG—2.0 and HDT—96.

The resin made by the process of this invention has a lower HV and better mechanical properties when compared to a DCPD resin prepared using a standard polyester process.

COMPARATIVE EXAMPLE C5 AND EXAMPLE 5

COMPARATIVE EXAMPLE C5

The process of Comparative Example C1 was used to prepare a resin having the following mole ratio: maleic anhydride (1.00 mol), ethanol (0.65 mol) and DPG (0.98 mol). Nmr analysis of the product material showed that the mole ratio of incorporated ethanol to maleic anhydride derived components was 13.4/100. The starting ratio was 65/100. Assuming no loss of maleic the ratio of initial/final ethanol is 13.4/65 or 21% ethanol retention.

EXAMPLE 5

Preparation of Ethanol and DCPD Capped DEG UP Resin Using the Inventive Process The first step of the process listed in Example 3 was used to prepare an intermediate having the following mole ratio:

maleic anhydride (100 mol), ethanol (48 mol), water (50 mol), and DCPD (75 mol). The reaction was carried out 127° C. until an AV of 214 was reached. The process used in Example 3 was modified by combining the second and third steps (0.6 mol 1:2 EG:DEG, hydroquinone, piperidine, triphenyl phosphite addition) and the mixture was reacted at 385° F. Nmr analysis of the product material showed that the mole ratio of incorporated ethanol to maleic anhydride derived components was 19.6/100. The starting ratio was 48/100. Assuming no loss of maleic the ratio of initial/final ethanol is 19.6/48 or 41% ethanol retention.

The resin made by the process of the invention uses less ethanol and more of the ethanol used is retained in the product. This improves the economics of the process and reduces the amount of ethanol that would need to be recycled or disposed.

Having thus describe the invention, we claim:

1. A process for preparing an unsaturated polyester resin, comprising;
   A. In a first step, reacting an unsaturated carboxylic acid having at least two carboxyl functional groups, its corresponding anhydride, or mixtures thereof, with a saturated monohydric alcohol, water and dicyclopentadiene, and
   B. In a second step, reacting the product of step one with a polyol, optionally in the presence of an oil containing unsaturation, its corresponding fatty acid or mixtures thereof.

2. The process as claimed in claim 1, wherein the first step the water and dicyclopentadiene are reacted with the unsaturated carboxylic acid, its corresponding anhydride or mixtures thereof and monohydric alcohol is reacted with the unsaturated carboxylic acid, its corresponding anhydride or mixtures thereof each in separate vessels and then combined to complete the reaction of the first step.

3. The process as claimed in claim 1, where in the first step the monohydric alcohol, dicyclopentadiene and water are added sequentially to the unsaturated carboxylic acid, its corresponding anhydride or mixtures thereof.

4. The process as claimed in claim 1, where in the first step the unsaturated carboxylic acid, its corresponding anhydride or mixtures thereof, monohydric alcohol, dicyclopentadiene and water are reacted simultaneously.

5. The process as claimed in claim 1 where the unsaturated carboxylic acid or its corresponding anhydride is maleic acid, fumaric acid, maleic anhydride or mixtures thereof.

6. The process as claimed in claim 1 where the saturated monohydric alcohol is methanol, ethanol, 1-propanol, 2-propanol, 1-butanol, 2-butanol or mixtures thereof.

7. The process as claimed in claim 1 where the polyol is an alkylene glycol, polyoxyalkylene glycol, or mixtures thereof.

8. The process as claimed in claim 1 where in the first step an aromatic dicarboxylic acid, its corresponding anhydride or mono- or diester is added to the reaction.

9. The process as claimed in claim 8 where the aromatic dicarboxylic acid, its corresponding anhydride or mono- or diester is isophthalic acid, terephthalic acid, phthalic anhydride, and mixtures thereof.

10. A process for preparing a polyester resin, comprising;
    A. in a first step reacting an unsaturated dicarboxylic acid or its corresponding anhydride or mixtures thereof selected from the group consisting of; maleic acid, fumaric acid and maleic anhydride with a saturated monohydric alcohol selected from the group consisting of; methanol, and ethanol, DCPD and water, and
    B. in a second step reacting the product of the first step with a polyol selected from the group consisting of; ethylene glycol, propylene glycol, 1,3-propanediol, 1,4-butanediol, 2,2-dimethyl-1,3-propanediol, 2-methyl-1,3-propanediol, diethylene glycol, dipropylene glycol, polyoxyethylene glycol, and polyoxypropylene glycol optionally in the presence of an oil containing or its corresponding fatty acid selected from the group consisting of castor oil, peanut oil, linseed oil, safflower oil, olive oil, cotton oil, rapeseed oil, soybean oil and tung oil.

* * * * *